United States Patent [19]

Dernovsek

[11] Patent Number: 4,922,525

[45] Date of Patent: May 1, 1990

[54] PAYSTATION THEFT INHIBITING CIRCUIT

[75] Inventor: John J. Dernovsek, Madison, Ala.

[73] Assignee: Palco Telecom Inc., Nashville, Tenn.

[21] Appl. No.: 374,784

[22] Filed: Jul. 3, 1989

[51] Int. Cl.⁵ .......................................... H04M 17/02
[52] U.S. Cl. ................................ 379/145; 379/150;
379/152; 194/202
[58] Field of Search ............... 379/155, 145, 150, 146,
379/152; 194/202

[56] References Cited

U.S. PATENT DOCUMENTS 2,765,366  10/1956  Holden ............................... 379/145

Primary Examiner—Stafford D. Schreyer
Attorney, Agent, or Firm—Robert J. Black

[57] ABSTRACT

A telephone paystation theft inhibiting circuit for detecting the grounding of the handset circuit conductors. Protection is provided for the receiver circuit conductor by means of an isolation transformer and solid state switching devices are employed to disconnect the transmitter from its associated circuit conductors when the grounding condition occurs.

6 Claims, 3 Drawing Sheets

PAYSTATION THEFT INHIBITING CIRCUIT

BACKGROUND OF THE INVENTION

1. Field of the Invention

The present invention relates to telephone paystations and more particularly to a theft inhibiting circuit operated to detect deliberate shorting of handset wires to render the internal coin relay inoperative.

2. Background Art

Most telephone paystations operate in such a manner that when coins are inserted they are held in escrow in a coin hopper until such time as an internal coin relay is activated to divert the money, if the call has been completed, to the cash vault, or in the alternative, if the call has not been completed, to a coin return chute. The internal coin relay operates in response to a coin control potential extended from the telephone central office, to which the paystation is connected.

One technique frequently employed to initiate theft of coins from a telephone paystation includes the insertion of a sharp conductive instrument (such as a nail or pin) into the armored handset cable usually employed between the telephone paystation body and the associated telephone handset. This action effectively shorts one or more of the internal conductors within the handset cable to the associated cable armor. This action then renders the coin relay inoperative, preventing the telephone central office from collecting or returning money held in escrow. When this has taken place the thief can then return to the paystation at some later time, remove the short, thus causing the accumulated money to exit the coin return. Obviously it is desirable to prevent this type of paystation theft.

Referring now to FIG. 1, the prior art arrangement is illustrated by a simplified schematic of a typical paystation. Connection is made to a telephone central office by means of three terminals designated L1, L2 and G. G is the earth ground terminal and acts as a reference point for all voltages. The chassis of the paystation, for reasons of safety, is kept at the same voltage potential as the earth ground terminal (G=0 volts). This potential is usually referred to as chassis ground. Terminals L1 and L2 are the telephone line connections which are used for transmission of voice as well as for application of the coin battery from the telephone central office which is utilized for operation of the internal coin relay shown as CR. Coin relay CR is an electro-mechanical device which diverts coins from the coin hopper to either the cash vault (collect) or the coin return chute (refund).

FIG. 2 of the prior art illustrates the normal flow for collecting coins. At the associated telephone office talk battery (typically 48 volts) is removed from terminals L1 and L2. Coin battery (typically 150 volts) is then connected to terminal L2 and terminal G. Current then flows from terminal L2 through closed coin relay contact CT and coin relay coil CR returning to the telephone central office via terminal G. The same path is used for refunding coins, as may be seen by reference to prior art FIG. 3, except that the coin battery polarity is reversed. A further understanding of coin relay details may be had by reference to U.S. Pat. Nos. 3,759,440; 3,759,441; and 4,386,690 all of which are assigned to the same assignee as the present application.

Prior art FIGS. 4 and 5 illustrate the manner in which a telephone paystation is disabled in both the collect and refund modes, respectively. As can be seen, one or more of the wires to the handset HS is shorted to the handset cable armor AC. When this takes place, it causes a direct current between the telephone circuit electronics (TC) to the telephone chassis ground CG. Since current follows the path of least resistance, coin battery current applied to terminals L2 and G bypasses coin relay CR rendering the coin relay inoperable and permitting the coins deposited to accumulate in the coin hopper.

Accordingly, it is the purpose of this disclosure to provide a circuit that is easily retrofitted to existing telephone paystations and permits the use of existing components within the paystation and handset. The present invention provides the proper DC bias to the existing transmitter except when a short to the chassis ground is detected, in which case the transmitter is then isolated from the telephone circuit electronics, allowing operation of the coin relay by the central office and thus preventing coin theft.

SUMMARY OF THE INVENTION

The purpose of the present invention is to provide a circuit which will prevent paystation theft caused by the grounding of the conductors within the paystation handset and/or cable assembly without modification to the existing paystation (except for the installation of the circuitry of the present invention). The included circuitry of the present invention utilizes a combination of transistor switching and AC coupling to permit coin relay operation even though the handset conductors have been grounded as the result of an attempted paystation theft. The present invention discloses circuitry which will prevent the user from disabling the paystation coin relay. The present circuit is such that it may be installed in any existing paystation without removal or modification of the paystation itself. The circuitry provides an economical means for the prevention of the particular type of theft that occurs when paystation handset conductors aren't grounded to the associated armored cable. The included circuitry does not require any additional logic or microcomputer control, therefore permitting its usage in a wide variety of paystation instruments.

BRIEF DESCRIPTION OF THE DRAWINGS

FIG. 1 is a simplified schematic diagram of a typical telephone paystation connected to a telephone central office.

FIG. 2 is a simplified schematic diagram of a typical telephone paystation connected to a central office showing by means of heavier lines the current flow utilized for collecting coins by application of coin battery from the telephone central office.

FIG. 3 is a simplified schematic diagram of a typical telephone paystation showing by means of heavier lines the current flow of coin battery of a polarity appropriate for the refunding of coins.

FIGS. 4 and 5 are simplified schematic diagrams of a typical telephone paystation showing the telephone handset conductors grounded to an associated armored cable and in heavier lines showing the current flow of coin battery from the telephone central office of appropriate polarity to cause collection of coins normally (FIG. 4) and refund of coins (FIG. 5) but showing the alternating current paths present when the handset conductors are grounded to an armored cable.

FIG. 6 is a simplified diagram showing the arrangement in which a telephone handset is connected to the conductors contained in an armored cable. The internal electronic telephone circuitry of a typical paystation with the telephone circuitry in turn being connected to a telephone central office.

DESCRIPTION OF THE PREFERRED EMBODIMENT

An obvious simple solution to the problem of handset grounding would be to utilize AC coupling of both the telephone transmitter and receiver as included in the handset, to the internal telephone circuitry. This technique would then eliminate any direct current paths from the telephone electronics to chassis ground. This technique is typically acceptable for existing telephone receivers. However, the carbon transmitter typically utilized in most paystations requires a direct current (DC) bias in order to permit operation.

While it might be possible for the transmitter unit to be replaced with a unit not requiring DC bias, the construction of a typical telephone handset is such that it would require destruction of the handset to remove the components within it. Obviously, therefore, this solution is both costly and undesirable and a similar technique requiring modification of handset components. The present invention eliminates any need for modification of the telephone handset, transmitter or receiver.

Figure 8:
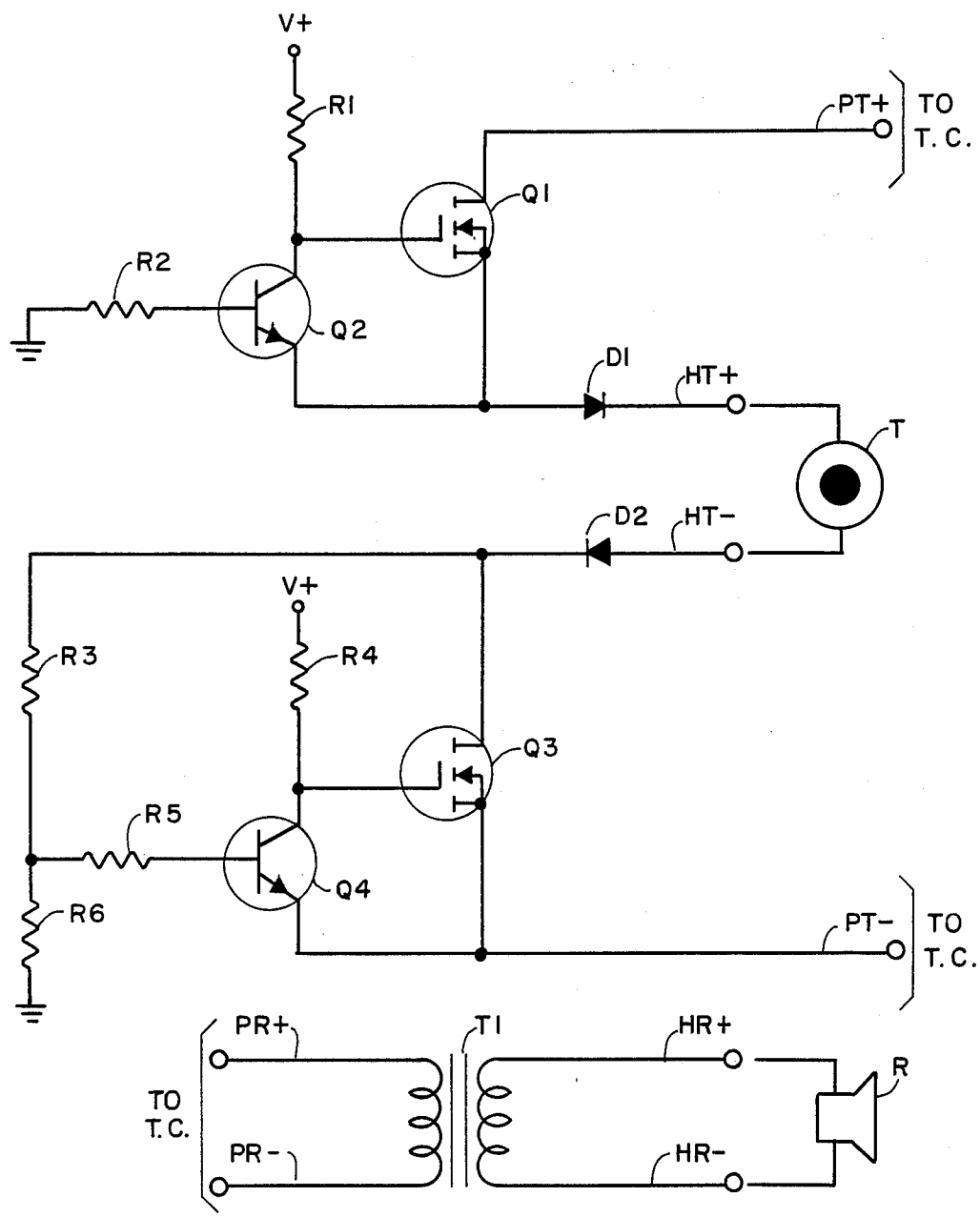
FIG. 8 is a schematic diagram of a theft inhibiting circuit for use in a telephone paystation in accordance with the terms of the present invention.

Referring first to prior art FIG. 8, a typical installation connection of the telephone handset to the included telephone circuit is shown. As may be noted, four wires designated HT+, HT−, HR+ and HR− exit the telephone circuitry and via armored cable AC are connected to the handset and specifically to the transmitter and receiver located within the handset. For the purpose of illustration and for better understanding, the interconnection between the telephone electronics and the handset are as follows:

PT+ = PAYSTATION TRANSMITTER POSITIVE TERMINAL
PT− = PAYSTATION TRANSMITTER NEGATIVE TERMINAL
PR+ = PAYSTATION RECEIVER POSITIVE TERMINAL
PR− = PAYSTATION RECEIVER NEGATIVE TERMINAL
HT+ = HANDSET TRANSMITTER POSITIVE WIRE
HT− = HANDSET TRANSMITTER NEGATIVE WIRE
HR+ = HANDSET RECEIVER POSITIVE WIRE
HR− = HANDSET RECEIVER NEGATIVE WIRE

Figure 1:
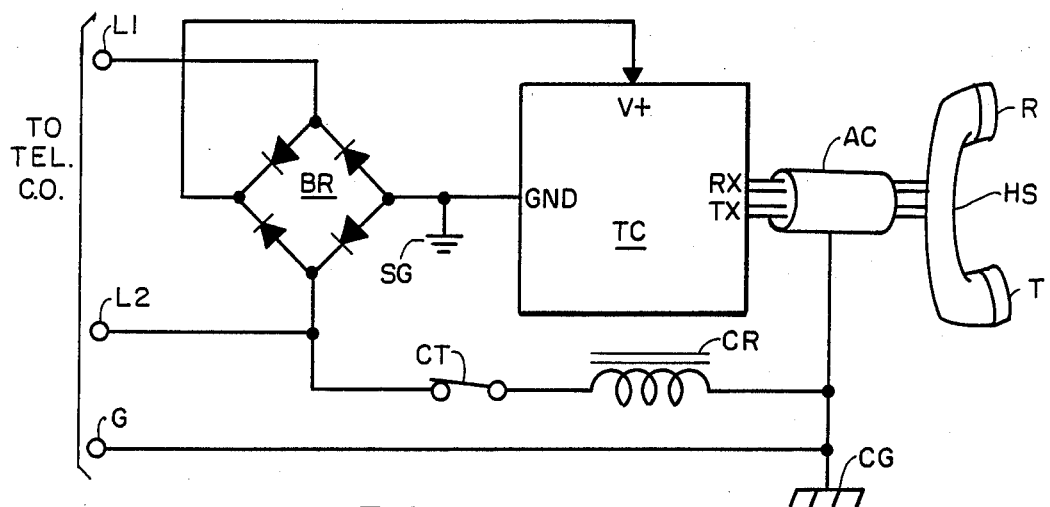
FIGS 1 through 6 are prior art figures.
Figure 2:
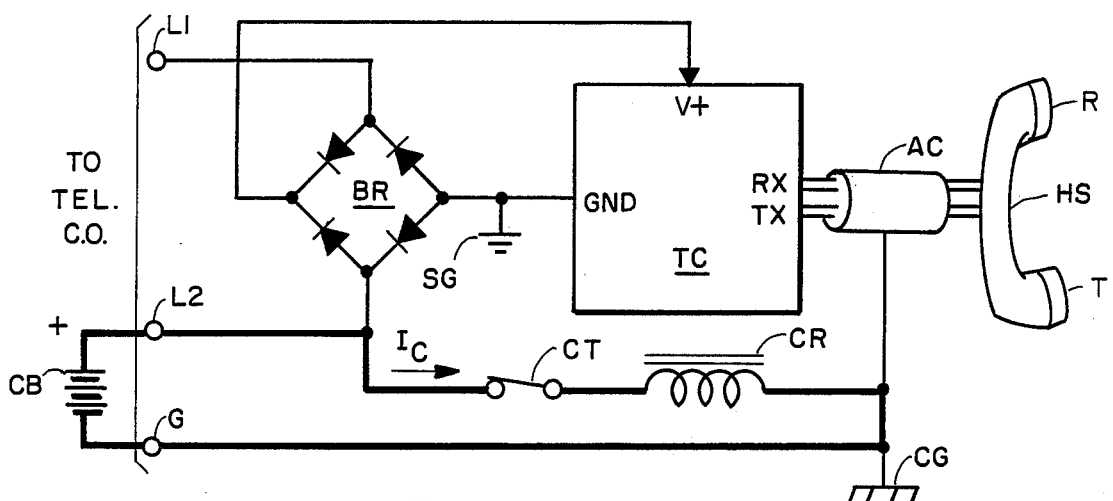
Figure 3:
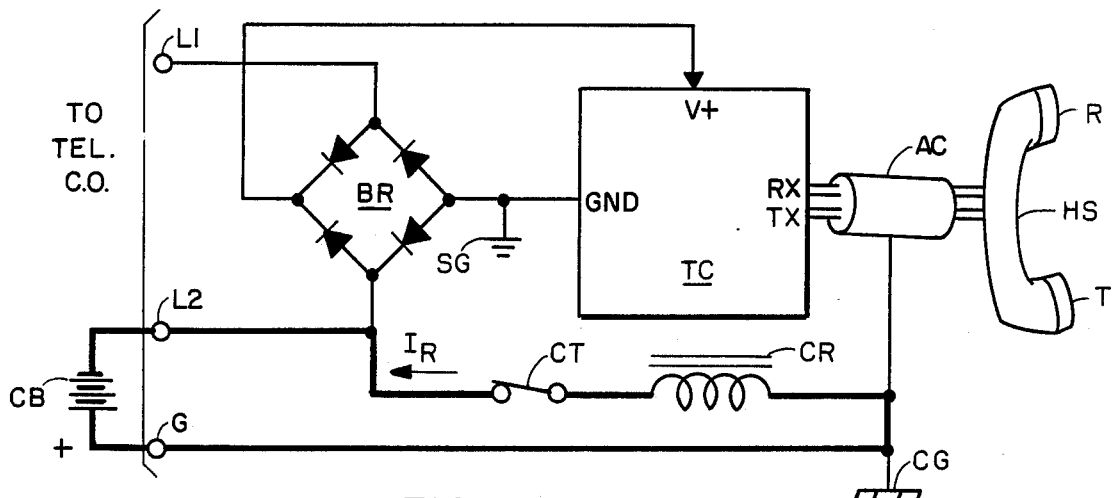
Figure 4:
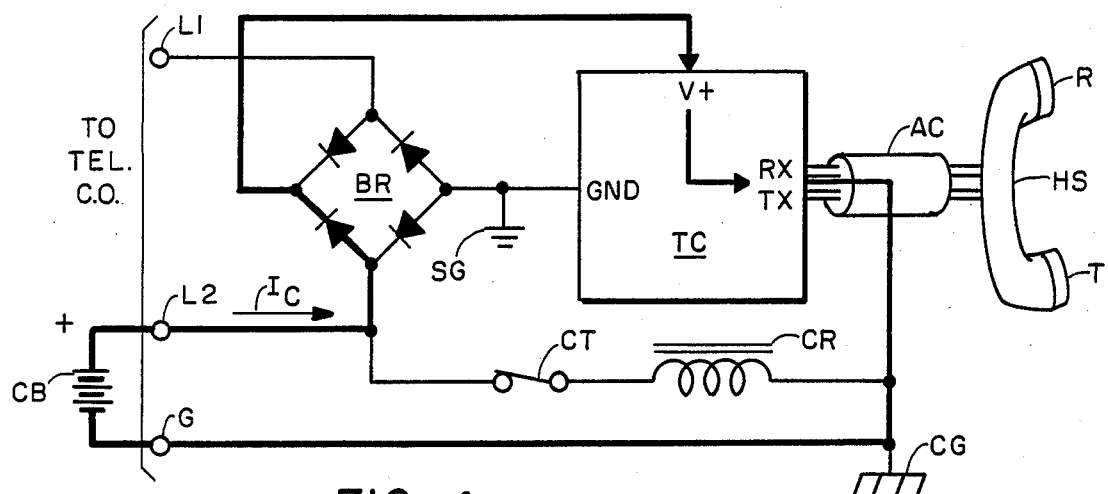
Figure 5:
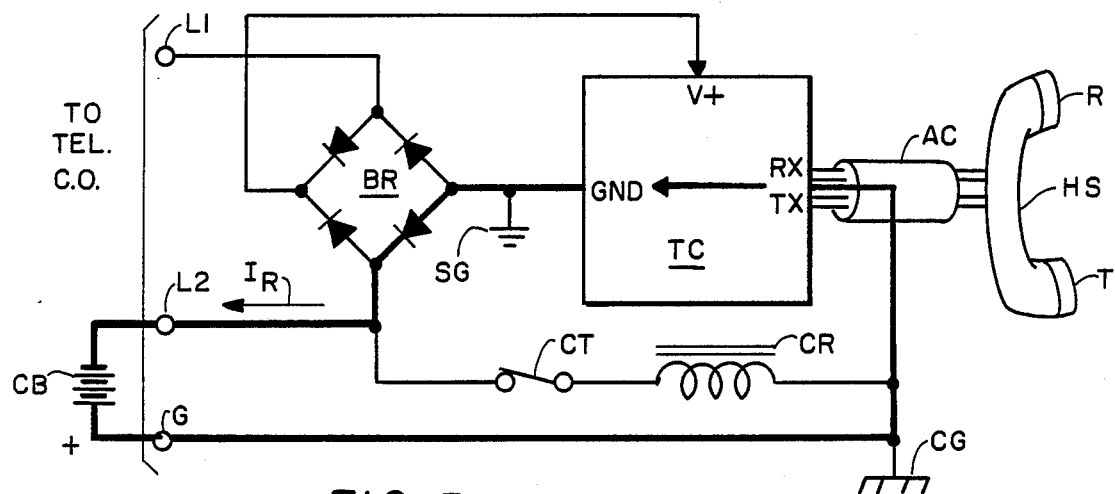
Figure 6:
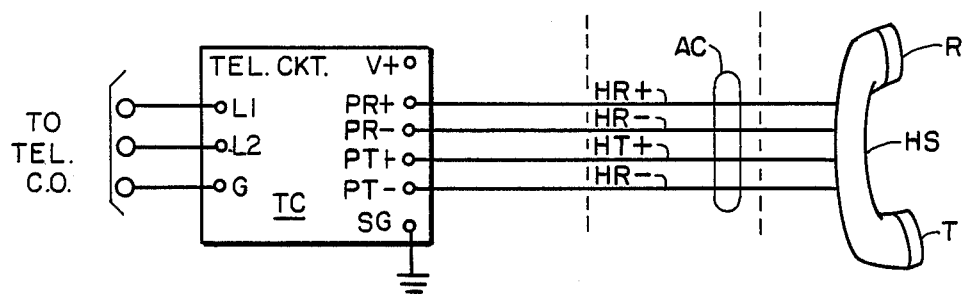
Figure 7:
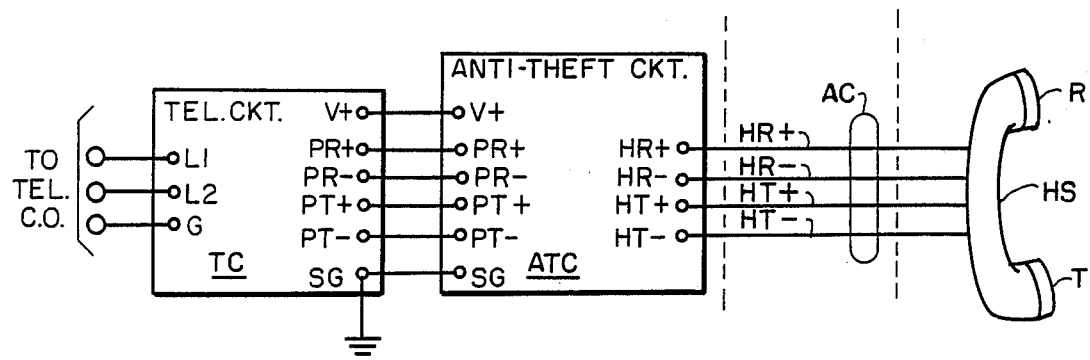
FIG. 7 shows the manner in which an anti-theft circuit is connected between a telephone handset and the electronic telephone circuitry of a typical telephone paystation as set forth in the present invention.

FIG. 6 (prior art) shows the handset HS connected directly to the telephone circuit TC as would be the situation in an unprotected paystation. FIG. 7 shows the anti-theft circuit ATC installed between the telephone circuit TC and the handset HS. For installation of the anti-theft circuit of the present invention, two additional connections are required from the telephone circuitry. These are V+ (positive voltage) and SG (signal ground). V+ provides power for the anti-theft circuit ATC while signal ground (SG) is utilized for the return path of circuit power as well as a reference point for fault detection. The terminal connections used by the anti-theft circuit ATC are typically found and accessible in convenient paystation locations. The anti-theft circuit ATC of the present invention is installed within a paystation's interior.

Referring now to FIG. 8 which illustrates the anti-theft circuit schematic. Inasmuch as the handset receiver R requires no DC bias current, transformer T1 is utilized to AC couple receiver R to the telephone electronics via terminals PR+ and PR−. From the foregoing it will be obvious that shorting leads HR+ or HR− to chassis ground provides no DC current path to the electronics therefore allowing the coin relay to operate in its normal manner.

Isolation of the transmitter T, however, requires a completely different technique due to the requirement for a DC bias to be present for proper operation of transmitter T. Transistors Q1 and Q3 are N-channel enhancement mode MOSFETs (Metal Oxide Semiconductor Field Effect Transistors) and are used to control the current paths to transmitter T. Transistors Q2 and Q4 are general purpose NPN transistors and are utilized for fault detection. Under normal operation, transistors Q1 and Q3 are turned on through pull-up resistors R1 and R4, respectively. Transistors Q2 and Q4 remain in the off condition. During operation of the coin relay under normal conditions, signal ground to chassis ground voltage will be approximately equal to that of the applied coin battery when applied from the telephone central office.

Should conductors HT+ and/or HT− be shorted to chassis ground as would occur when a sharp instrument, such as a pin or nail, is passed through the armored cable, conductors HT+ and/or HT− are shorted to chassis ground. Should coin battery be applied to terminals L2 and G of the telephone circuitry to the collect operation, conductors HT+ and HT− are forced to a potential more negative than signal ground. This then causes current to flow from signal ground through resistor R2 and transistor Q2 to the fault of grounded point causing transistor Q2 to turn on. This, in effect, then forces transistor Q1 off and disconnects the current path from terminal PT+ to the fault location. Diode D2 is reverse biased and acts to block the current path from PT− to the fault. The resistance of resistor R2 is chosen to be much greater than that of coin relay.

During initiation of a refund condition from the telephone central office, when a faulted condition occurs, terminals HT+ and HT− are forced to a potential more positive than signal ground. At this time transistor Q4 is turned on and forces transistor Q3 to the off condition. This arrangement then blocks the current path from the fault to PT−. Diode D1 is also reverse biased thus blocking the current path from the fault to PT+. The resistance of resistor R3 is also chosen to be much higher than that of the coin relay. The ratio of resistor R3 and resistor R6 is so chosen that transistor Q4 will remain off under normal conditions. A zener diode or any other form of voltage reference may be substituted for resistor R6.

All of the components of the present invention are chosen to withstand the voltages typically found within paystations. The components values are also chosen to minimize power consumption and any transmission loss.

While but a single embodiment of the present invention has been shown, it will be obvious to those skilled in the art that numerous modifications can be made without departing from the spirit of the invention which shall be limited only by the scope of the claims appended hereto.

What is claimed is:

1. In a telephone paystation, a paystation housing, including a telephone circuit, a handset, including a transmitter and a receiver, a first plurality of circuit conductors connecting said telephone receiver to said telephone circuit, a second plurality of telephone conductors, connecting said transmitter to said telephone circuit, a metallic sheath extending from said telephone housing to said handset and including internal thereto said first and second plurality of circuit conductors, said telephone circuit further including circuit connections to a telephone central office and a circuit ground, and circuit ground also including a connection to said metallic sheath, the improvement comprising:

a paystation theft inhibiting circuit, including a transformer, including a first winding connected to said receiver via said first plurality of circuit conductors and a second winding connected to said telephone circuit;

first and second switch means normally operated to connect said second plurality of circuit conductors connected to said transmitter, to said telephone circuit;

and third or in the alternative fourth switching means operated in response to the establishment of a conductive circuit connection between at least one of said second plurality of circuit conductors in said metallic sheath, to said sheath, to render said first or in the alternative second switch means inoperative, whereby said transmitter is disconnected from said telephone circuit.

2. A paystation theft inhibiting circuit as claimed in claim 1 wherein:

said first and second switch means each comprise a solid state switching device.

3. A paystation theft inhibiting circuit as claimed in claim 2 wherein:

said solid state switching device comprises an N-channel enhancement mode, metal oxide semi-conductor field effect transistor.

4. A paystation theft inhibiting circuit as claimed in claim 1 wherein:

said third and fourth switching means each comprise a solid state switching device.

5. A paystation theft inhibiting circuit as claimed in claim 4 wherein:

said solid state switching device comprises an NPN transistor.

6. A paystation theft inhibiting circuit as claimed in claim 1 wherein:

said transformer comprises an isolation transformer including first and second windings each having an equal number of turns.

* * * * *